United States Patent [19]
Fritzsch

[11] 3,884,568
[45] May 20, 1975

[54] PROJECTION DEVICE FOR EXPOSING SPHERICAL SURFACES

[75] Inventor: Walter Fritzsch, Stetten, Germany

[73] Assignee: Dornier-System GmbH, Germany

[22] Filed: June 25, 1973

[21] Appl. No.: 373,257

[30] Foreign Application Priority Data
Aug. 11, 1972 Germany............................ 2239620

[52] U.S. Cl................ 353/62; 350/175 FS; 353/69; 353/70; 353/79; 353/97; 353/122
[51] Int. Cl............................................. G03b 21/14
[58] Field of Search........... 353/10, 62, 69, 70, 122, 353/28, 79, 80, 97; 352/43, 87, 228; 355/47; 350/175 SL, 175 FS

[56] References Cited
UNITED STATES PATENTS
3,663,753   5/1972   Low et al. ..................... 350/175 FS

*Primary Examiner*—Richard E. Aegerter
*Assistant Examiner*—Steven L. Stephan
*Attorney, Agent, or Firm*—James E. Bryan

[57] ABSTRACT

This invention relates to an improvement in a projection device for exposing a spherical surface to light including a light source, a condenser lens, a pattern holder, and a imaging lens, the improvement comprising aperture stop means between said condenser lens and said imaging lens, said aperture stop means having a light-transmissive opening means therein so dimensioned that only those projected rays will pass through for the formation of an image which have the smallest angle with reference to a line normal to the spherical surface having the image thereon.

1 Claim, 1 Drawing Figure

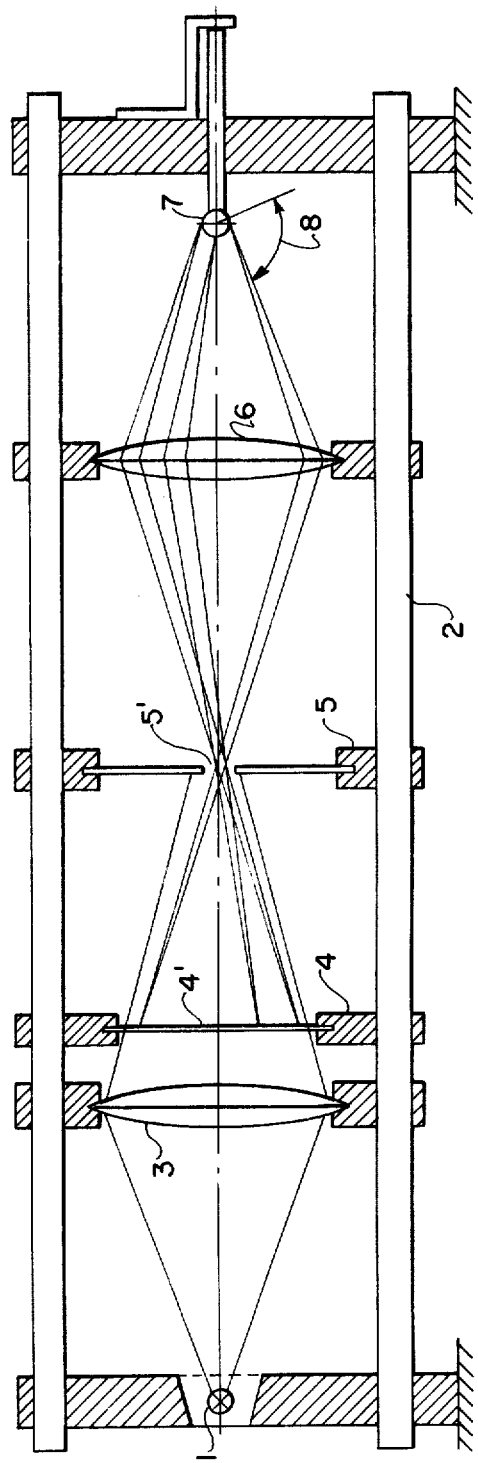

PROJECTION DEVICE FOR EXPOSING SPHERICAL SURFACES

The present invention relates to a projection device for exposing spherical surfaces with a pattern, for example a pattern of grooves to be treated by etching or, chemical or electrochemical milling.

Exemplary surfaces are spiral groove bearings which are frequently used for high-speed apparatuses, such as gyroscopes, centrifuges, and the like. They operate according to the principle of a rotatable shaft and a stationary supporting member. The rotatable shaft has a spherically-shaped shaft end which is provided at the surface thereof with spirally-extending identical grooves which are applied from the equator to the pole of the sphere or ball. The counterpart of this ball or sphere is a ball cup or socket without spiral grooves. Between the ball cup and the rotating spherical shaft end, a supporting lubricating film is formed due to the feed of lubricant through the spirally-shaped grooves between the two bearing sliding surfaces. This supporting lubricating film prevents a contact friction of the bearing sliding surfaces during the operation of such spiral groove bearings.

The formation of spirally-shaped grooves on the spherical surface is obtained in a manner known per se by projecting the image of a groove pattern onto the ball surface, and the spherical surface is coated for this purpose with a light-sensitive emulsion. The image is customarily projected onto the spherical surface by means of a slide. This results in difficulties in the projection on the spherical surface, particularly in the equatorial area of the ball, since in case of an oblique or glancing incidence of the projecting light beams near the ball equator an exact separation of the image structures is impossible. Furthermore, the light intensity with respect to the pole parts is greatly reduced. This lighting or exposure on the ball surfaces causes inaccurate width ratios of the individual grooves during the subsequent etching or chemical milling.

Since, however, the effect of the spirally-extending oil grooves is very great precisely in the equatorial zone or area of the ball, due to the highest circumferential speed, the requirement arises for as much precision as possible relative to the groove formation in this particular area.

It is the object of the present invention to project the groove pattern with the aid of a projection device exactly to the equator of the ball in order to thereby attain as accurate as possible a groove formation over the entire hemispherical region or area.

This object is obtained, in accordance with the present invention, by virtue of the fact that positioned in the projection device between a condenser lens, with an adjacent aperture or film holder, and the imaging lens is an aperture stop or diaphragm, and by virtue of the fact that its light-transmissive opening is so dimensioned that only those light beams will contribute to the image formation on the spherical surface which have an angle as small as possible relative to a line normal to the respective surface having the image thereon.

It is possible with the aid of the aforementioned arrangement of an exposure device to project groove patterns which are accurately reproduced from the pole to the equator of the hemisphere, thereby producing the prerequisite for the subsequent chemical treatment so that a precise groove formation and design are effectively achieved.

One embodiment of the present invention will now be described in further detail hereinafter with reference to the accompanying drawing wherein the single FIGURE thereof schematically represents the structure of the inventive projection device.

Positioned in a receiving device 2 are a light source 1, a condenser lens 3, an aperture 4, an aperture stop or diaphragm 5, imaging lens 6, and the ball 7 to be exposed. The beam of light rays through the projection device is indicated by thinly drawn lines.

The light source 1 is controllable or regulatable with respect to time in a manner which is known per se and which will therefore not be described further herein. The diverging beam of rays emanating therefrom is reversed in a convergent manner by the adjacent condenser lens 3. The aperture or film holder 4 in which a slide 4' is present with the pattern to be reproduced on the spherical surface 7, is mounted in tandem with respect to the condenser lens 3 and is positioned in the convergent ray or beam region of the condenser lens 3. Located in the focal point of the condenser lens 3 is an aperture stop or diaphragm 5 whose light-transmissive opening 5' delimits the reproducing or projected beam or bundle of rays. Arranged between the aperture stop or diaphragm 5 and the ball 7 is an imaging lens 6 serving as the projecting system of the groove pattern onto the spherical surface, which is provided with a light-sensitive coating. By means of the aforementioned opening 5' of the aperture stop or diaphragm 5, the opening for the reproducing beam of rays is delimited and therewith the rays which are tangent at the equator of the ball are previously blocked. As a result, only those light rays will impinge or strike upon the spherical surface which have an angle 8 between a line normal to the respective surface and the projected light beam or bundle. On the basis of this arrangement, it is possible to effect an exact projection of the groove pattern on the spherical surface which encloses or surrounds at least half of the ball and assures the required accuracy also in the area of the ball equator. Also possible is a reproduction or image of the pattern to a certain degree beyond the equator.

For purposes of precisely adjusting the optical elements, such as lenses, diaphragm, and aperture stop, the receiving device 2 is so constructed and arranged that a displacement of the individual elements in the longitudinal direction at the two fixed guide rails is possible without difficulty. An exchange of the lenses for others is readily possible so that spherical surfaces of the most diversified sizes can be exposed.

It will be obvious to those skilled in the art that many modifications may be made within the scope of the present invention without departing from the spirit thereof, and the invention includes all such modifications.

What is claimed is:

1. In a projection device for exposing a spherical surface to light including a light source, a condenser lens, a pattern holder, and an imaging lens,
the improvement comprising aperture stop means between said condenser lens and said imaging lens, said aperture stop means having a light-transmissive opening means therein which is the minimum aperture for accurate projection, whereby only those projected rays will pass through for the formation of an image which, at the point of their representation, impinge upon the spherical surface with as large an angle as possible with respect to the tangential plane at the point of impingement of the rays.

* * * * *